US012671669B2

(12) United States Patent
Lv

(10) Patent No.: US 12,671,669 B2
(45) Date of Patent: Jun. 30, 2026

(54) METHOD FOR SENDING DNS MESSAGE, TERMINAL, AND NETWORK-SIDE DEVICE

(71) Applicant: VIVO MOBILE COMMUNICATION CO., LTD., Dongguan (CN)

(72) Inventor: Huazhang Lv, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 64 days.

(21) Appl. No.: 18/652,950

(22) Filed: May 2, 2024

(65) Prior Publication Data

US 2024/0283771 A1 Aug. 22, 2024

Related U.S. Application Data

(63) Continuation of application No. PCT/CN2022/129091, filed on Nov. 1, 2022.

(30) Foreign Application Priority Data

Nov. 4, 2021 (CN) .......................... 202111302509.8

(51) Int. Cl.
*H04L 61/4511* (2022.01)
(52) U.S. Cl.
CPC ................................ *H04L 61/4511* (2022.05)
(58) Field of Classification Search
CPC ............. H04L 61/4511; H04L 61/3015; H04L 61/1511
USPC ........................................................ 709/245
See application file for complete search history.

(56) References Cited

U.S. PATENT DOCUMENTS

| | | | | |
|---|---|---|---|---|
| 12,381,844 | B2 * | 8/2025 | Peterson | ............. H04L 61/4511 |
| 2004/0246948 | A1 * | 12/2004 | Lee | ......................... H04L 45/04 |
| | | | | 370/254 |
| 2017/0264590 | A1 * | 9/2017 | Xing | ................... H04L 63/1483 |
| 2018/0262462 | A1 * | 9/2018 | Blinn | ................. H04L 61/4552 |
| 2022/0191165 | A1 | 6/2022 | Zhu et al. | |
| 2023/0079974 | A1 | 3/2023 | Xiong | |
| 2023/0086304 | A1 | 3/2023 | Xiong | |

FOREIGN PATENT DOCUMENTS

| | | |
|---|---|---|
| CN | 112468604 A | 3/2021 |
| CN | 112752253 A | 5/2021 |
| CN | 113115480 A | 7/2021 |
| CN | 113206894 A | 8/2021 |
| WO | 2021043191 A1 | 3/2021 |

OTHER PUBLICATIONS

3GPP, "3rd Generation Partnership Project; Technical Specification Group Services and System Aspects; Procedures for the 5G System (5GS); Stage 2 (Release 17)", 3GPP Standard TS 23.502, Oct. 29, 2021, pp. 102-144, XP052087235.

(Continued)

*Primary Examiner* — Jude Jean Gilles
(74) *Attorney, Agent, or Firm* — The Webb Law Firm

(57) ABSTRACT

A method for sending a DNS message includes obtaining, by a terminal, a to-be-sent message; and sending the to-be-sent message to a target DNS server specified by an operator in case of determining that the to-be-sent message is a DNS query.

20 Claims, 5 Drawing Sheets

12

Network-side device

11

11

Terminal

Terminal

(56)          References Cited

OTHER PUBLICATIONS

3GPP, "3rd Generation Partnership Project; Technical Specification Group Services and System Aspects; System architecture for the 5G System (5GS); Stage 2 (Release 17)", 3GPP Standard TS 23.501, Nov. 3, 2021, pp. 428-462, XP052087234.

3GPP, "3rd Generation Partnership Project; Technical Specification Group Services and System Aspects; 5G System Enhancements for Edge Computing; Stage 2 (Release 17)", 3GPP Standard TS 23.548 V17.0.0, Sep. 24, 2021, pp. 15-27, XP052056734.

* cited by examiner

Network-side device

12

11

11

Terminal

Terminal

200

S210

A terminal obtains a to-be-sent message

S212

The terminal sends the to-be-sent message to a target DNS server specified by an operator in case of determining that the to-be-sent message is a DNS query

METHOD FOR SENDING DNS MESSAGE, TERMINAL, AND NETWORK-SIDE DEVICE

CROSS-REFERENCE TO RELATED APPLICATIONS

This application is a Bypass Continuation Application of International Patent Application No. PCT/CN2022/129091, filed Nov. 1, 2022, and claims priority to Chinese Patent Application No. 202111302509.8, filed Nov. 4, 2021, the disclosures of which are hereby incorporated by reference in their entireties.

BACKGROUND OF THE INVENTION

Field of the Invention

This application pertains to the field of wireless communications technologies, and specifically relates to a method for sending a DNS message, a terminal, and a network-side device.

Description of Related Art

An edge application server discovery function (EASDF) is a core network element responsible for handling domain name system (DNS) query requests sent by terminals. In related technologies, the EASDF is a network element controlled by an operator and has the ability to search for edge servers. A terminal does not have knowledge of address information of this network element and cannot ensure that a sent DNS request can be sent to this network element. As a result, the terminal cannot effectively utilize the service provided by the operator to search for edge servers.

SUMMARY OF THE INVENTION

According to a first aspect, a method for sending a DNS message is provided, including: obtaining, by a terminal, a to-be-sent message; and sending the to-be-sent message to a target DNS server specified by an operator in case of determining that the to-be-sent message is a DNS query.

According to a second aspect, an apparatus for sending a DNS message is provided, including: a first obtaining module configured to obtain a to-be-sent message; and a first transceiver module configured to send the to-be-sent message to a target DNS server specified by an operator in case of determining that the to-be-sent message is a DNS query.

According to a third aspect, a method for configuring a DNS server configuration is provided, including: receiving, by a network-side device, indication information sent by a terminal, where the indication information indicates that the terminal has a target capability; obtaining, by the network-side device, address information of a target DNS server specified by an operator; and sending, by the network-side device, the address information of the target DNS server to the terminal.

According to a fourth aspect, an apparatus for configuring a DNS server is provided, including: a second transceiver module configured to receive indication information sent by a terminal, where the indication information indicates that the terminal has a target capability; a second obtaining module configured to obtain address information of a target DNS server specified by an operator; and a second transceiver module configured to send the address information of the target DNS server to the terminal.

According to a fifth aspect, a terminal is provided, where the terminal includes a processor, a memory, and a program or instructions stored in the memory and executable on the processor, and when the program or instructions are executed by the processor, the steps of the method according to the first aspect are implemented.

According to a sixth aspect, a terminal is provided, including a processor and a communications interface, where the processor is configured to implement the steps of the method according to the first aspect, and the communications interface is configured to communicate with a network-side device.

According to a seventh aspect, a network-side device is provided, where the network-side device includes a processor, a memory, and a program or instructions stored in the memory and executable on the processor and when the program or instructions are executed by the processor, the steps of the method according to the third aspect are implemented.

According to an eighth aspect, a network-side device is provided, including a processor and a communications interface, where the processor is configured to implement the steps of the method according to the third aspect, and the communications interface is configured to communicate with a terminal.

According to a ninth aspect, a non-transitory readable storage medium is provided, where the non-transitory readable storage medium has a program or instructions stored thereon, and when the program or instructions are executed by a processor, the steps of the method according to the first aspect are implemented, or the steps of the method according to the third aspect are implemented.

According to a tenth aspect, a chip is provided, where the chip includes a processor and a communications interface, the communications interface is coupled to the processor, and the processor is configured to run a program or instructions to implement the steps of the method according to the first aspect or the steps of the method according to the third aspect.

According to an eleventh aspect, a computer program/program product is provided, where the computer program/program product is stored in a non-transitory storage medium, and the program/program product is executed by at least one processor to implement the steps of the method according to the first aspect, or the steps of the method according to the third aspect.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application fall within the protection scope of this application.

The terms "first", "second", and the like in the specification and claims of this application are used to distinguish between similar objects rather than to describe a specific order or sequence. It should be understood that the terms used in this way are interchangeable in appropriate circumstances such that the embodiments of this application can be implemented in other orders than the order illustrated or described herein. In addition, objects distinguished by "first" and "second" are generally of a same type, and the quantities of the objects are not limited. For example, there may be one or more first objects. In addition, in this specification and claims, "and/or" indicates at least one of the connected objects, and the character "/" generally indicates an "or" relationship between the contextually associated objects.

It is worth noting that the technology described in the embodiments of this application is not limited to long term evolution (LTE)/LTE-Advanced (LTE-A) systems, but may also be used in other wireless communications systems such as code division multiple access (CDMA), time division multiple access (TDMA), frequency division multiple access (FDMA), orthogonal frequency division multiple access (OFDMA), single-carrier frequency division multiple access (SC-FDMA), and other systems. The terms "system" and "network" are often used interchangeably in the embodiments of this application. The technologies described may be used in the above-mentioned systems and radio technologies as well as other systems and radio technologies. In the following descriptions, a new radio (NR) system is described for an illustration purpose, and NR terms are used in most of the following descriptions, although these technologies may also be applied to other applications than an NR system application, for example, the 6th generation (6G) communications system.

Figure 1:
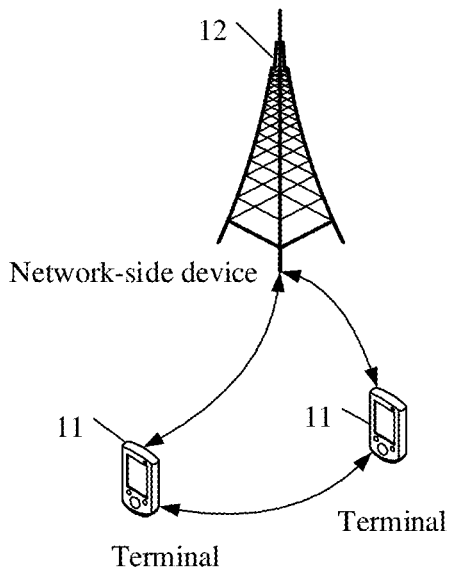
FIG. 1 is a schematic diagram of a wireless communications system to which embodiments of this application are applicable.

FIG. 1 is a schematic diagram of a wireless communications system to which embodiments of this application are applicable. The wireless communications system includes a terminal 11 and a network-side device 12. The terminal 11 may also be referred to as a terminal device or user equipment (UE). The terminal 11 may be a terminal-side device such as a mobile phone, a tablet personal computer, a laptop computer also referred to as a notebook computer, a personal digital assistant (PDA), a palmtop computer, a netbook, an ultra-mobile personal computer (UMPC), a mobile internet device (MID), a wearable device or a vehicle user equipment (VUE), or a pedestrian user equipment (PUE). The wearable device includes a smart watch, a wristband, earphones, glasses, and the like. It should be noted that a specific type of the terminal 11 is not limited in this embodiment of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a NodeB, an evolved node B (eNB), a home NodeB, a home evolved NodeB, a WLAN access point, a Wi-Fi node, a transmission and reception point (TRP), or other appropriate terms in the art. Provided that the same technical effects are achieved, the base station is not limited to any specific technical term. It should be noted that in the embodiments of this application, only the base station in the NR system is used as an example, although the specific type of the base station is not limited.

The following describes in detail a DNS message sending solution provided in the embodiments of this application through some embodiments and application scenarios thereof with reference to the accompanying drawings.

Figure 2:
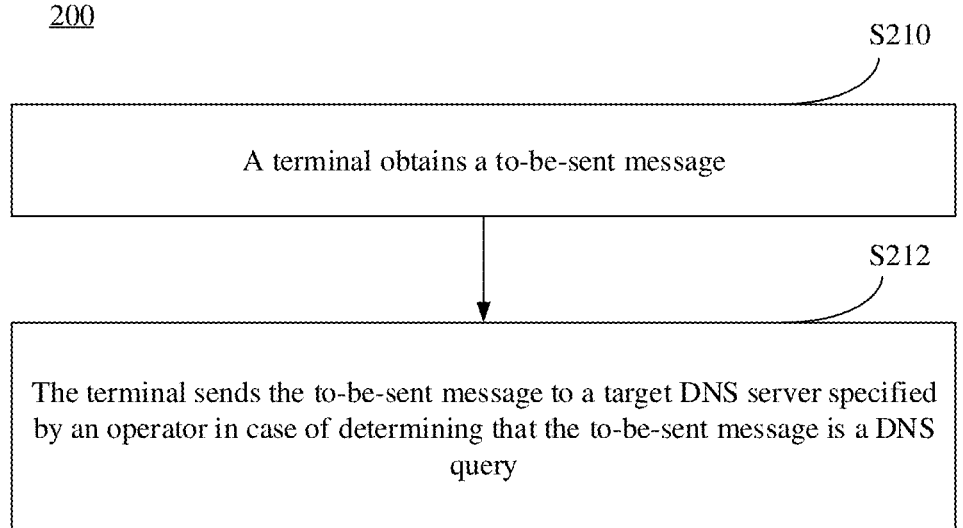
FIG. 2 is a schematic flowchart of a method for sending a DNS message according to an embodiment of this application.

FIG. 2 is a schematic flowchart of a method for sending a DNS message according to an embodiment of this application. The method 200 may be performed by a terminal. In other words, the method may be performed by software or hardware installed in the terminal. As shown in FIG. 2, the method may include the following steps.

S210. A terminal obtains a to-be-sent message.

In this embodiment of this application, the to-be-sent message may be a message to be sent by the terminal through an application (APP) on its application layer.

S212. The terminal sends the to-be-sent message to a target DNS server specified by an operator in case of determining that the to-be-sent message is a DNS query.

In this embodiment of this application, in a case that the to-be-sent message is determined to be a DNS query (which alternatively may be referred to as a DNS request or a DNS query request), the to-be-sent message is sent to the target DNS server specified by the operator, which can ensure that the DNS query message or the DNS request message of the terminal can be sent to the target DNS server specified by the operator, such as the EASDF, thereby taking full advantage of the service provided by the target DNS server specified by the operator.

In a possible implementation, the to-be-sent message may carry a fully qualified domain name (FQDN). In this case, the terminal can generate a DNS query containing the fully qualified domain name and send the generated DNS query to the target DNS server specified by the operator.

In this embodiment of this application, the operator refers to an operator providing services for the terminal, for example, an operator providing a SIM card for the terminal.

In a possible implementation of this embodiment of this application, before S210, the method may further include receiving address information of the target DNS server from a network-side device. In this embodiment of this application, the address information of the target DNS server can be sent to the terminal by the network-side device. For example, the operator can send an IP address of its specified DNS server to the terminal through the network-side device (for example, SMF, session management function).

In a possible implementation, the terminal may further receive the address information of the target DNS server from the network-side device through a PCO in a NAS message.

Optionally, after receiving the address information of the target DNS server from the network-side device, the terminal can set the address information of the target DNS server to a highest-priority DNS server address on an operating system of the terminal, thereby ensuring that the DNS query message or DNS request message is sent to the target DNS server.

In the foregoing optional implementation, setting the address information of the target DNS server to a highest-priority DNS server address on an operating system (OS) of the terminal means that: DNS query messages or DNS request messages sent by all APPs on the terminal are sent to the target DNS server; or, when all APPs on the terminal send DNS query messages or DNS request messages over the PDU session (that is, a PDU session used to receive the address information of the target DNS server), the target DNS server has the highest priority; or DNS query messages or DNS request messages sent by all APPs on the terminal over the PDU session are all sent to the target DNS server. The target DNS server having the highest priority means that, compared to other DNS configurations sent by the network-side device, configurations stored in the OS of the terminal, or DNS configurations specified by the user, the priority of the target DNS server is the highest.

In a possible implementation, after receiving the address information of the target DNS server from the network-side device through the PDU session, the terminal may bind the address information of the target DNS server with the PDU session, so that DNS request messages or DNS query messages sent over the PDU session may be sent to the target DNS server.

In a possible implementation, in S210, the terminal may obtain the to-be-sent message from a first application and determine that the to-be-sent message is to be sent over the PDU session, and then in S212, the terminal may send the to-be-sent message by using the address information of the target DNS server as a destination address of the to-be-sent message in case of determining that the to-be-sent message is a DNS query message or DNS request message, and/or the terminal uses the address information of the target DNS server for DNS query and/or resolution.

In a possible implementation, after receiving the address information of the target DNS server from the network-side device, the method further includes forwarding the address information of the target DNS server to a second application on the application layer. Through this possible implementation, the second application can use the address of the target DNS server as the destination IP when sending DNS query messages or DNS request messages, thereby sending DNS query messages or DNS request messages to the target DNS server.

In a possible implementation, to ensure that services of the target DNS server are not illegitimately used, the second application may be an application with a target permission, where the target permission is a permission to receive the address information of the DNS server specified by the operator. In other words, in this possible implementation, the address information of the target DNS server can be sent only to applications with the permission to receive the address information of the DNS server specified by the operator.

In specific applications, the second application may obtain the target permission by signing a contract with the operator, or the second application may be an application specified by the operator.

In a possible implementation, the terminal may obtain identification information of applications with the target permission from the network-side device, and after receiving the address information of the target DNS server from the network-side device, forwards the address information of the target DNS server to the second application with the target permission on the application layer. The identification information of applications includes at least one of the following: application ID, application descriptor (which may include OSID, OSappID), or the like. The application descriptor is used to identify application(s) on a UE OS. The application ID is used to identify an application.

In a possible implementation of this embodiment of this application, the network-side device may send the address information of the target DNS server to the terminal only in case of determining that the terminal has a target capability. To enable the network-side device to know whether the terminal has the target capability, in this possible implementation, before receiving the address information of the target DNS server from the network-side device, the method further includes: sending, by the terminal, indication information to the network-side device, where the indication information is used to indicate that the terminal has the target capability.

Optionally, the target capability includes but is not limited to at least one of the following:

(1) The terminal is deployed with a first functional entity, where the first functional entity is capable of sending a DNS query request to a DNS server specified by an operator. For example, the terminal is configured with an edge DNS client (EDC) or edge DNS function, and the EDC or edge DNS function is capable of sending a DNS query to the target DNS server specified by the operator.

(2) The terminal supports obtaining the address information of the DNS server specified by the operator from the network-side device.

(3) The terminal supports obtaining the address information of the DNS server specified by the operator from the network-side device through a PDU session and configuring the obtained address information of the DNS server to the PDU session, that is, binding the obtained address information of the DNS server with the PDU session.

(4) The terminal supports not modifying a DNS configuration specified by the operator after the DNS configuration is obtained. For example, the DNS configuration may not be manually modified by the user or modified by an APP on the terminal, or a priority of the DNS configuration may not be lowered because the user has configured a private DNS configuration (resulting in the DNS configuration of the operator not being used).

(5) The terminal supports forwarding the DNS configuration specified by the operator to applications with a target permission, where the target permission is a permission to receive the address information of the DNS server specified by the operator. In this possible implementation, the terminal can indicate applications currently deployed on the terminal to the network-side device (for example, the terminal reports a current list of APPs on the terminal through a NAS message), so that the network-side device can determine and indicate to the terminal which applications have the target permission.

(6) The terminal supports forwarding a DNS response received from the DNS server specified by the operator to an application, for example, supporting forwarding a DNS response to an application that has sent the DNS query message or DNS request message.

In a possible implementation, after sending the to-be-sent message to a target DNS server specified by an operator, the method may further include receiving the DNS response returned by the target DNS server, where the DNS response carries the address information of the target server (for example, an edge application server (EAS)), and the target server is a server with a closest topological distance to the terminal obtained by the operator-specified DNS server in resolving the to-be-sent message.

For example, the terminal sends a DNS query message to the target DNS server (for example, EASDF). Then, the EASDF obtains an IP address of a server with a closest topological distance to the terminal based on information such as the fully qualified domain name (FQDN) of the DNS query message, and returns the IP address of the server to the terminal through a DNS response.

In the foregoing possible implementation, in a case that the to-be-sent message is a message to be sent by the first application, after the receiving the DNS response returned by the target DNS server, the method may further include forwarding the DNS response to the first application on the application layer, where the first application is an application that is to send the to-be-sent message.

In this embodiment of this application, a new terminal capability is proposed. A terminal with this new terminal capability may perform at least one of the following operations:

(1) With this feature, the terminal can send DNS query requests to the DNS server (for example, EASDF) specified by the operator. The DNS server can respond to the DNS query with an IP address of a server with a closest topological distance to a UE terminal (the IP address is obtained after the DNS server resolves a FQDN in the DNS query).

(2) The terminal can indicate this terminal capability to the network side through a NAS message, and after obtaining the capability indication, the network side may issue an IP address of a DNS server specified by the operator and with the edge server discovery function to the terminal through a PDU session. After receiving the DNS server address, the terminal may set the server IP address as the highest priority for the PDU session and resolve DNS queries sent by the application.

Terminals without this terminal capability may not be capable of receiving the IP address of the DNS server with the edge server discovery function and specified by the operator from the 5G core network, or may receive and then discard the address, cannot use the DNS address as a DNS server address with the highest priority, cannot send the DNS address to an application on the application layer, or cannot ensure that the DNS query sent in the PDU session will be sent to the DNS server specified by the operator.

In this embodiment of this application, the terminal with this terminal capability receives (through a PDU session) the DNS server IP address sent by the operator from the network side, and performs at least one of the following:

(1) setting the DNS server address as a highest-priority DNS server address on the UE OS, where all DNS queries on the UE use the DNS server for query and/or resolution;

(2) binding the DNS server with the PDU session, where all DNS queries within the PDU session (from the application layer) use the DNS server address for DNS query/resolution;

(3) sending all DNS queries (from the application layer) within the PDU session to the DNS server address (for example, an EASDF IP address);

(4) when an application on the UE invokes an API of a first function, or when an application on the UE does not explicitly indicate not to use services provided by the first function, for a DNS query sent by the application, the UE must send the DNS query to the DNS server specified by the operator; or (5) the UE OS can forward the DNS server IP address to the application on the application layer.

In an implementation, the first function may be: an EDC (EDC: edge DNS client, or edge discovery client) or a client supported by the UE, where the client can send DNS queries on the UE to the DNS server specified by the operator; or the client can send the IP address of the DNS server issued by the operator to the application layer.

The technical solution provided by this embodiment of this application ensures that applications on the terminal can use the operator's edge computing service (that is, provide an EAS with a closest topological distance or route to the terminal for applications on the terminal) and that the DNS queries issued by the terminal application can be sent to the DNS server specified by the operator.

Corresponding to the foregoing method for sending a DNS message, an embodiment of this application further provides a method for configuring a DNS server.

Figure 3:
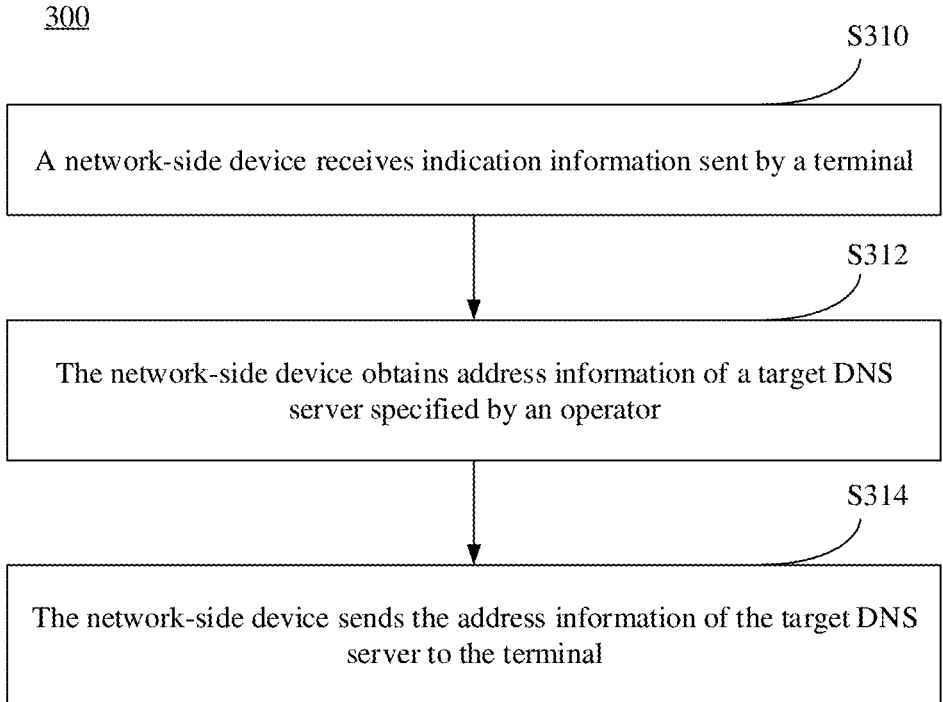
FIG. 3 is a schematic flowchart of a method for configuring a DNS server according to an embodiment of this application.

FIG. 3 is a flowchart of a method for configuring a DNS server according to an embodiment of this application. The method 300 may be performed by a network-side device. In other words, the method may be performed by software or hardware installed on the network-side device. As shown in FIG. 3, the method may include the following steps.

S310. A network-side device receives indication information sent by a terminal, where the indication information indicates that the terminal has a target capability.

In this embodiment of this application, the network-side device may be a session management function (SMF) entity or an access and mobility management function (AMF) entity.

For example, the terminal may send the indication information to the network-side device through a NAS message (NAS message).

The NAS message includes but is not limited to at least one of the following:

(1) a PDU session establishment request; or (2) a PDU session modification request.

In a possible implementation, similar to the method 200, the target capability includes but is not limited to at least one of the following:

(1) The terminal is deployed with a first functional entity, where the first functional entity is capable of sending a DNS query request to a DNS server specified by an operator. For example, the terminal is configured with an edge DNS client (EDC) or edge DNS function, and the EDC or edge DNS function is capable of sending a DNS query to the target DNS server specified by the operator.

(2) The terminal supports obtaining the address information of the DNS server specified by the operator from the network-side device.

(3) The terminal supports obtaining the address information of the DNS server specified by the operator from the network-side device through a PDU session and configuring the obtained address information of the DNS server to the PDU session, that is, binding the obtained address information of the DNS server with the PDU session.

(4) The terminal supports not modifying a DNS configuration specified by the operator after the DNS configuration is obtained. For example, the DNS configuration may not be manually modified by the user or modified by an APP on the terminal, or a priority of the DNS configuration may not be lowered because the user has configured a private DNS configuration (resulting in the configuration of the operator not being used).

(5) The terminal supports forwarding the DNS configuration specified by the operator to applications with a target permission, where the target permission is a permission to receive the address information of the DNS server specified by the operator. In this possible implementation, the terminal can indicate applications currently deployed on the terminal to the network-side device (for example, the terminal reports a current list of APPs on the terminal through a NAS message), so that the network-side device can determine and indicate to the terminal which applications have the target permission.

(6) The terminal supports forwarding a DNS response received from the DNS server specified by the operator to an application, for example, supporting forwarding a DNS response to an application that has sent the DNS query message or DNS request message.

S312. The network-side device obtains address information of a target DNS server specified by an operator.

In a possible implementation, the network-side device may obtain the address information of the target DNS server based on subscription information of the terminal, location information of the terminal, and a user plane PDU session anchor (PSA) to which the terminal is anchored. For example, after receiving the capability indication information from the terminal, the SMF may send an Nnrf_NFDiscovery request to a network repository function (NRF) network element to search for a target DNS server, such as an EASDF.

S314. The network-side device sends the address information of the target DNS server to the terminal.

In S314, the network-side device may also send to the terminal identification information of applications with a permission to receive the address information of the target DNS server.

For example, the network-side device may send the address information of the target DNS server to the terminal using protocol configuration options (PCO).

In a possible implementation, after the network-side device receives the indication information from the terminal, the network-side device may determine the identification information of the applications with a permission to receive the address information of the target DNS server, specifically based on one of the following:

1. The network-side device (for example, AMF or SMF) sends a Nudm_SDM_Get request or Nudm_SDM_Subscribe request to a unified data management entity (UDM), requesting subscription information in the UDM. The UDM feeds back identification information of APPs subscribed with an operator to the AMF or SMF.

2. An SMF or UDM sends a Nudr_DM_Query request or Nudr_DM_Subscribe request to a unified data repository (UDR), requesting subscription information in the UDR. The UDR feeds back identification information of APPs subscribed with an operator to the SMF or UDM. If it is a request from the UDM to the UDR, the SMF may request the UDM to obtain the identification information of APPs subscribed with the operator from the UDR.

After receiving the identification information of APPs subscribed with the operator fed back from the UDM or UDR, the SMF may send the received identification information of APPs to the terminal, for example, sending a NAS message to the terminal.

Alternatively, the network-side device may receive first indication information sent by the terminal, where the first indication information indicates applications on the terminal, and determine, based on the first indication information, an application in the applications on the terminal that is capable of obtaining the address information of the target DNS server. Then the network-side device sends the determined application identifier of the application to the terminal.

The identification information of APPs subscribed with the operator may be stored in the UDR. One possible case is as follows: Data Set=Application data, Data Subset=subscription application ID, and Data Key=at least one or more of SUPI, GPSI, Internal Group Identifier, External Group Identifier, or application ID.

Alternatively, the identification information of APPs subscribed with the operator may be stored in the UDM. In the UDM, these data may be stored in manners as follows: in Subscription data type=Session Management Subscription data, Data Subset=subscription application ID, and Data Key=at least one or more of SUPI, GPSI, Internal Group Identifier, External Group Identifier, or application ID.

In a possible implementation, after the network-side device obtains address information of a target DNS server specified by an operator, the method further includes at least one of the following:

(1) The network-side device indicates a functional identifier to the terminal, where the functional identifier is used to indicate a functional entity, corresponding to the functional identifier, to which an operating system or a chip sends the address information after receiving the address information of the target DNS server.

(2) The network-side device indicates an application identifier to the terminal, where the application identifier is used to indicate an application capable of obtaining the address information of the target DNS server. The application identifier may be the foregoing identification information of APPs obtained from the UDM or UDR, or may be an application identifier that determines an application in the applications on the terminal that is capable of obtaining the address information of the target DNS server.

In the foregoing possible implementation, the network-side device may indicate the functional identifier and/or application identifier while sending the address information of the target DNS server to the terminal, or may indicate the functional identifier and/or application identifier before or after sending the address information of the target DNS server. This is not limited in this embodiment of this application.

In this embodiment of this application, when knowing that the terminal has the target capability, the network-side device provides the address information of the DNS server with a closest topological distance or route to the terminal for applications on the terminal so that the terminal can use the DNS server for DNS query and/or resolution, taking full advantage of edge computing services provided by the operator.

It should be noted that the method for sending a DNS message provided in the embodiments of this application may be performed by an apparatus for sending a DNS message or a control module for performing the method for sending a DNS message in the apparatus for sending a DNS message. In the embodiments of this application, the apparatus for sending a DNS message performing the method for sending a DNS message is used as an example to describe the apparatus for sending a DNS message provided in this embodiment of this application.

Figure 4:
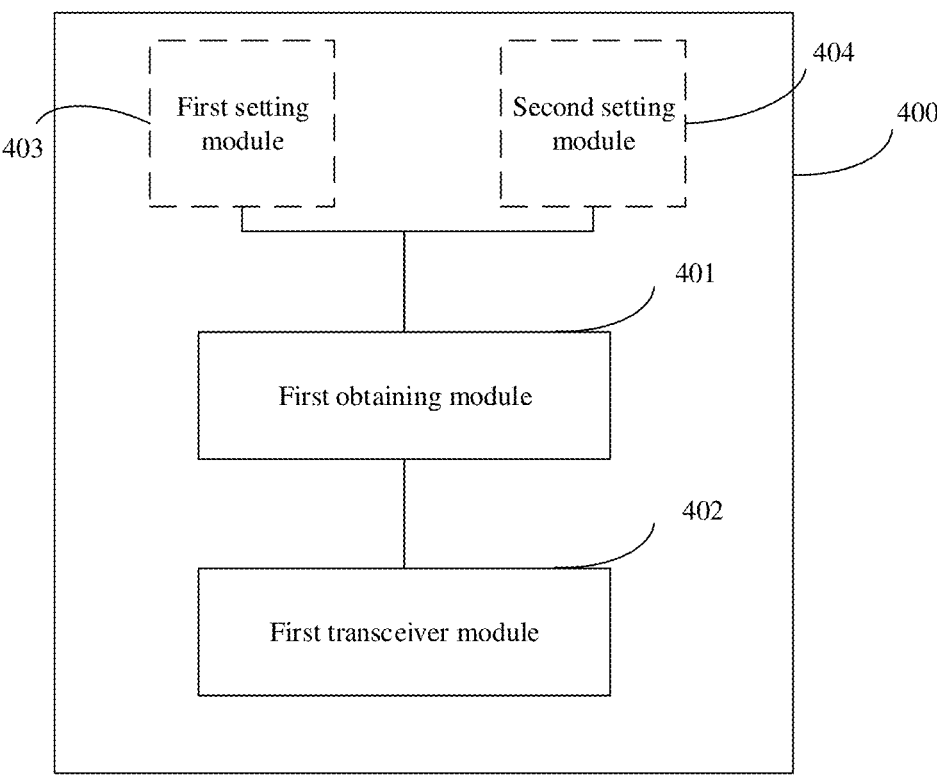
FIG. 4 is a schematic structural diagram of an apparatus for sending a DNS message according to an embodiment of this application.

FIG. 4 is a schematic structural diagram of an apparatus for sending a DNS message provided in this application. As shown in FIG. 4, the apparatus mainly includes: a first obtaining module 401 configured to obtain a to-be-sent message; and a first transceiver module 402 configured to send the to-be-sent message to a target DNS server specified by an operator in case of determining that the to-be-sent message is a DNS query.

In a possible implementation, the first transceiver module 402 is further configured to receive address information of the target DNS server from a network-side device before the to-be-sent message is obtained.

In a possible implementation, the apparatus may further include a first setting module 403 configured to set the address information of the target DNS server as a highest-priority DNS server address on an operating system of the terminal.

In a possible implementation, the first transceiver module 402 receiving address information of the target DNS server from a network-side device includes:

receiving the address information of the target DNS server from the network-side device through a PDU session.

In a possible implementation, the apparatus further includes a second setting module 404 configured to bind the address information of the target DNS server with the PDU session.

In a possible implementation, the first obtaining module 401 obtaining a to-be-sent message includes obtaining the to-be-sent message from a first application and determining that the to-be-sent message is to be sent over the PDU session.

The first transceiver module 402 sending the to-be-sent message to a target DNS server specified by an operator includes at least one of the following:

sending the to-be-sent message by using the address information of the target DNS server as a destination address of the to-be-sent message; or using the address information of the target DNS server for DNS query and/or resolution.

In a possible implementation, the first transceiver module 402 is further configured to forward the address information of the target DNS server to a second application on the application layer.

In a possible implementation, the second application is an application with a target permission, where the target permission is a permission to receive the address information of the DNS server specified by the operator.

In a possible implementation, the first obtaining module 401 is further configured to obtain identification information of applications with the target permission from the network-side device before obtaining the to-be-sent message.

In a possible implementation, the first transceiver module 402 is further configured to send indication information to the network-side device before receiving the address information of the target DNS server from the network-side device, where the indication information is used to indicate that the terminal has a target capability.

In a possible implementation, the target capability includes at least one of the following:

the terminal is deployed with a first functional entity, where the first functional entity is capable of sending a DNS query request to the DNS server specified by the operator;

the terminal supports obtaining the address information of the DNS server specified by the operator from the network-side device;

the terminal supports obtaining the address information of the DNS server specified by the operator from the network-side device through a PDU session and configuring the obtained address information of the DNS server to the PDU session;

the terminal supports not modifying a DNS configuration specified by the operator after the DNS configuration is obtained;

the terminal supports forwarding the DNS configuration specified by the operator to applications with a target permission, where the target permission is a permission to receive the address information of the DNS server specified by the operator; or the terminal supports forwarding a DNS response received from the DNS server specified by the operator to an application.

In a possible implementation, the first transceiver module 402 is further configured to receive the DNS response returned by the target DNS server after sending the to-be-sent message to the target DNS server specified by the operator, where the DNS response carries the address information of the target server, and the target server is a server with a closest topological distance to the terminal obtained by resolving the to-be-sent message.

In a possible implementation, the first transceiver module 402 is further configured to forward the DNS response to the first application on the application layer after receiving the DNS response returned by the target DNS server, where the first application is an application that is to send the to-be-sent message.

The apparatus for sending a DNS message in this embodiment of this application may be an apparatus, or may be a component, an integrated circuit, or a chip in a terminal. The apparatus may be a mobile terminal or a non-mobile terminal. For example, the mobile terminal may include but is not limited to the foregoing illustrated types of terminals 11. The non-mobile terminal may be a server, a network attached storage (NAS), a personal computer (PC), a television (TV), a teller machine, a self-service machine, or the like. This is not specifically limited in this embodiment of this application.

The apparatus for sending a DNS message in this embodiment of this application may be an apparatus with an operating system. The operating system may be an android (Android) operating system, an iOS operating system, or another possible operating system. This is not specifically limited in this embodiment of this application.

The apparatus for sending a DNS message provided in this embodiment of this application is capable of implementing various processes that are implemented by the terminal in the method embodiments of FIG. 2 and FIG. 3, with the same technical effects achieved. To avoid repetition, details are not repeated herein.

It should be noted that, a method for configuring a DNS server provided in an embodiment of this application may be performed by an apparatus for configuring a DNS server, or a control module configured to perform the method for configuring a DNS server in the apparatus for configuring a DNS server. In this embodiment of this application, the apparatus for configuring a DNS server performing the method for configuring a DNS server is used as an example to describe the apparatus for configuring a DNS server provided in this embodiment of this application.

Figure 5:
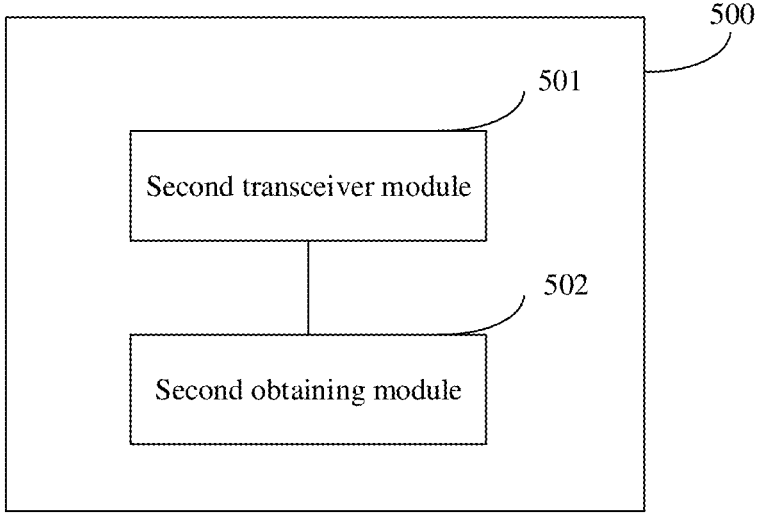
FIG. 5 is a schematic structural diagram of an apparatus for configuring a DNS server according to an embodiment of this application.

FIG. 5 is a schematic structural diagram of an apparatus for configuring a DNS server according to an embodiment of this application. As shown in FIG. 5, the apparatus mainly includes a second transceiver module 501 and a second obtaining module 502.

In this embodiment of this application, the second transceiver module 501 is configured to receive indication information sent by a terminal, where the indication information indicates that the terminal has a target capability; the second obtaining module 502 is configured to obtain address information of a target DNS server specified by an operator; and the second transceiver module 501 is further configured to send the address information of the target DNS server to the terminal.

In a possible implementation, the second obtaining module 502 obtaining address information of a target DNS server specified by an operator includes obtaining the address information of the target DNS server based on subscription information of the terminal, location information of the terminal, and a user plane PSA to which the terminal is anchored.

In a possible implementation, the second transceiver module 501 sending the address information of the target DNS server to the terminal includes sending the address information of the target DNS server to the terminal using PCO.

In a possible implementation, the second transceiver module 501 is further configured to perform one of the following:

indicating a functional identifier to the terminal, where the functional identifier is used to indicate a functional entity, corresponding to the functional identifier, to which an operating system or a chip sends the address information after receiving the address information of the target DNS server; and indicating an application identifier to the terminal, where the application identifier is used to indicate an application capable of obtaining the address information of the target DNS server.

In a possible implementation, the second obtaining module 502 is further configured to perform one of the following:

receiving first indication information sent by the terminal, where the first indication information indicates applications on the terminal; determining, based on the first indication information, an application in the applications on the terminal that is capable of obtaining the address information of the target DNS server; and obtaining an identifier of an application contracted with the operator from a unified data management entity UDM or a unified data repository UDR.

In a possible implementation, the target capability includes at least one of the following:

the terminal is deployed with a first functional entity, where the first functional entity is capable of sending a DNS query request to the DNS server specified by the operator;

the terminal supports obtaining the address information of the DNS server specified by the operator from the network-side device;

the terminal supports obtaining the address information of the DNS server specified by the operator from the network-side device through a PDU session and configuring the obtained address information of the DNS server to the PDU session;

the terminal supports not modifying a DNS configuration specified by the operator after the DNS configuration is obtained;

the terminal supports forwarding the DNS configuration specified by the operator to applications with a target permission, where the target permission is a permission to receive the address information of the DNS server specified by the operator; or the terminal supports forwarding a DNS response received from the DNS server specified by the operator to an application.

The apparatus for configuring a DNS server in this embodiment of this application may be an apparatus, or may be a component, an integrated circuit, or a chip in a network-side device.

The apparatus for configuring a DNS server in this embodiment of this application may be an apparatus having an operating system. The operating system may be an android (Android) operating system, an iOS operating system, or another possible operating system. This is not specifically limited in this embodiment of this application.

The apparatus for configuring a DNS server provided in this embodiment of this application is capable of implementing various processes that are implemented by the network-side device in the method embodiments of FIG. 2 and FIG. 3, with the same technical effects achieved. To avoid repetition, details are not repeated herein.

Figure 6:
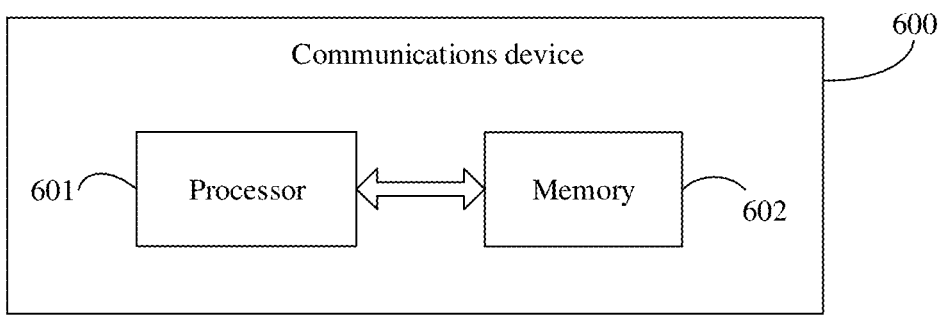
FIG. 6 is a schematic structural diagram of a communications device according to an embodiment of this application.

Optionally, as shown in FIG. 6, an embodiment of this application further provides a communications device 600, including a processor 601, a memory 602, and a program or instructions stored in the memory 602 and executable on the processor 601. For example, in a case that the communications device 600 is a terminal, when the program or instructions are executed by the processor 601, the processes of the foregoing embodiment of the method for sending a DNS message are implemented, with the same technical effects achieved. In a case that the communications device 600 is a network-side device, when the program or instructions are executed by the processor 601, the processes of the foregoing embodiment of the method for configuring a DNS server are implemented, with the same technical effects achieved. To avoid repetition, details are not repeated herein.

Figure 7:
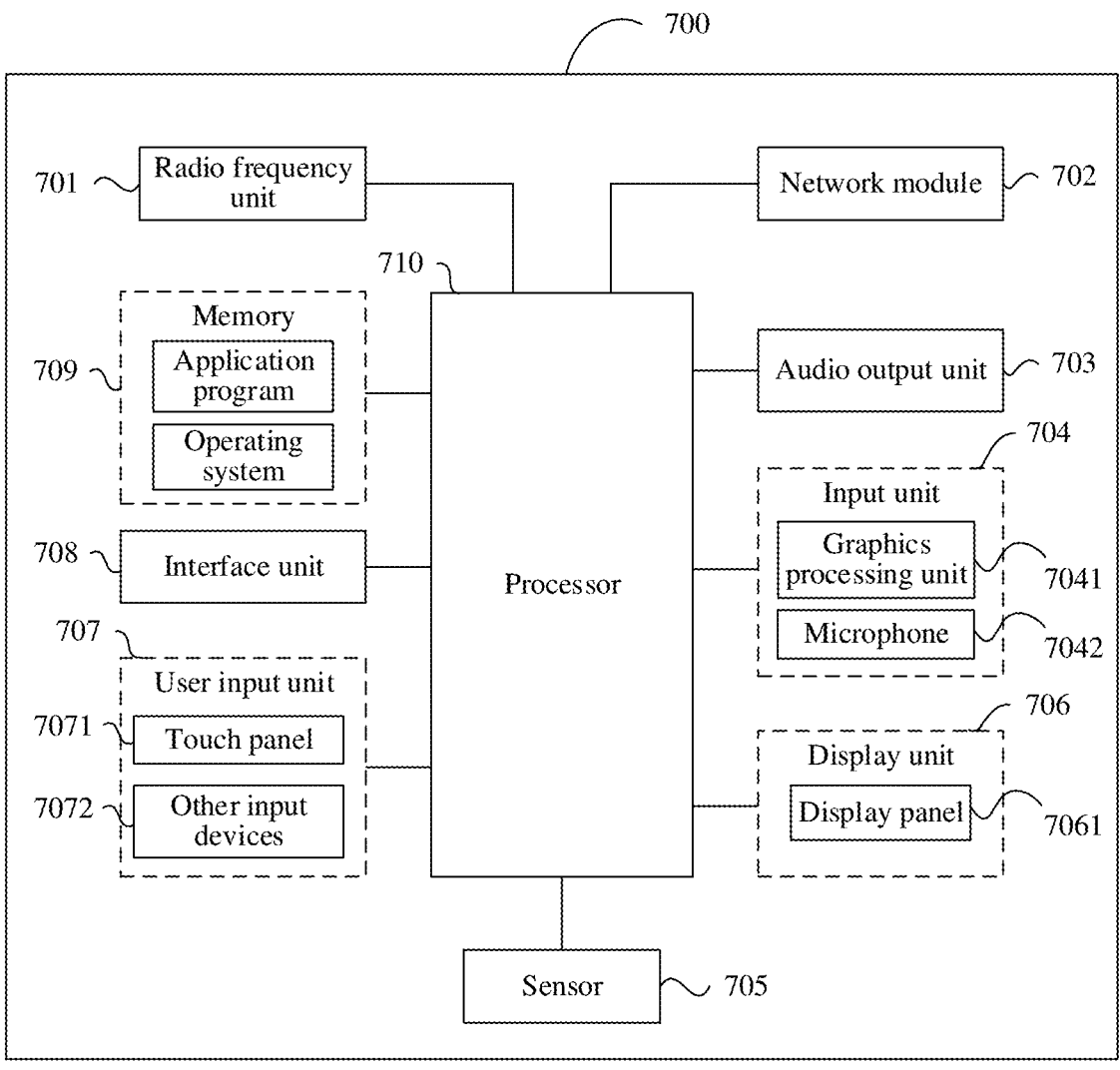
FIG. 7 is a schematic diagram of a hardware structure of a terminal according to an embodiment of this application.

An embodiment of this application further provides a terminal including a processor and a communications interface. The processor is configured to implement the processes of the foregoing embodiment of the method for sending a DNS message, and the communications interface is configured to communicate with a network-side device. This terminal embodiment corresponds to the foregoing method embodiment on the terminal side. All processes and implementations in the foregoing method embodiment can be applicable to this terminal embodiment, with the same technical effects achieved. Specifically, FIG. 7 is a schematic diagram of a hardware structure of a terminal for implementing embodiments of this application.

The terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

Those skilled in the art can understand that the terminal 700 may further include a power supply (for example, a battery) that supplies power to various components. The power supply may be logically connected to the processor 710 through a power management system, so that functions such as charge and discharge management and power consumption management are implemented by using the power management system. The terminal is not limited to the terminal structure shown in FIG. 7. The terminal may include more or fewer components than shown in the figure, or combine some of the components, or arrange the components differently. Details are not described herein.

It should be understood that in this embodiment of this application, the input unit 704 may include a graphics processing unit (GPU) 7041 and a microphone 7042. The graphics processing unit 7041 processes image data of a static picture or a video that is obtained by an image capture apparatus (for example, a camera) in a video capture mode or an image capture mode. The display unit 706 may include the display panel 7061. The display panel 7061 may be configured in a form of a liquid crystal display, an organic light-emitting diode, or the like. The user input unit 707 includes a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a function button (for example, a volume control button or a power button), a trackball, a mouse, and a joystick. Details are not described herein.

In this embodiment of this application, the radio frequency unit 701 sends downlink data received from a network-side device to the processor 710 for processing, and in addition, sends uplink data to the network-side device. Generally, the radio frequency unit 701 includes but is not limited to an antenna, at least one amplifier, a transceiver, a coupler, a low noise amplifier, and a duplexer.

The memory 709 may be configured to store software programs or instructions and various data. The memory 709 may mainly include a program or instructions storage area and a data storage area. The program or instructions storage area may store an operating system, an application program or instructions required by at least one function (for example, an audio play function or an image play function), and the like. In addition, the memory 709 may include a high-speed random access memory, and may further include a non-transitory memory, where the non-transitory memory may be a read-only memory (ROM), a programmable read-only memory (PROM), an erasable programmable read-only memory (EPROM), an electrically erasable programmable read-only memory (EEPROM), or a flash memory, for example, at least one disk storage device, flash memory device, or other non-transitory solid-state storage device.

The processor 710 may include one or more processing units. Optionally, the processor 710 may integrate an application processor and a modem processor. The application processor mainly processes an operating system, a user interface, application programs or instructions, and the like. The modem processor mainly processes wireless communication, for example, being a baseband processor. It can be understood that the modem processor may alternatively be not integrated in the processor 710.

The processor 710 is configured for the terminal to obtain a to-be-sent message.

The radio frequency unit 701 is configured to send the to-be-sent message to a target domain name system (DNS) server specified by an operator in case of determining that the to-be-sent message is a DNS query.

In this embodiment of this application, the terminal obtains a to-be-sent message, and sends the to-be-sent message to a target DNS server specified by an operator in case of determining that the to-be-sent message is a DNS query message or a DNS request message, which can ensure that the DNS query message or a DNS request message of the terminal is sent to the target DNS server specified by the operator, taking full advantage of the service provided by the target DNS server specified by the operator.

Optionally, the radio frequency unit 701 is further configured to receive address information of the target DNS server from a network-side device before the terminal obtains the to-be-sent message.

Optionally, the processor 710 is further configured to set the address information of the target DNS server as a highest-priority DNS server address on an operating system of the terminal.

Optionally, the radio frequency unit 701 receives the address information of the target DNS server from the network-side device through a protocol data unit PDU session.

Optionally, the processor 710 is further configured to bind the address information of the target DNS server with the PDU session.

Optionally, the processor 710 obtains the to-be-sent message from a first application and determines that the to-be-sent message is to be sent over the PDU session; and the radio frequency unit 701 sends the to-be-sent message by using the address information of the target DNS server as a destination address of the to-be-sent message, and/or uses the address information of the target DNS server for DNS query and/or resolution.

Optionally, the radio frequency unit 701 is further configured to forward the address information of the target DNS server to a second application on the application layer.

Optionally, the second application is an application with a target permission, where the target permission is a permission to receive the address information of the DNS server specified by the operator.

Optionally, the radio frequency unit 701 is further configured to obtain identification information of applications with the target permission from the network-side device.

Optionally, the radio frequency unit 701 is further configured to send indication information to the network-side device, where the indication information is used to indicate that the terminal has a target capability.

Optionally, the target capability includes at least one of the following:

the terminal is deployed with a first functional entity, where the first functional entity is capable of sending a DNS query request to the DNS server specified by the operator;

the terminal supports obtaining the address information of the DNS server specified by the operator from the network-side device;

the terminal supports obtaining the address information of the DNS server specified by the operator from the network-side device through a PDU session and configuring the obtained address information of the DNS server to the PDU session;

the terminal supports not modifying a DNS configuration specified by the operator after the DNS configuration is obtained;

the terminal supports forwarding the DNS configuration specified by the operator to applications with a target permission, where the target permission is a permission to receive the address information of the DNS server specified by the operator; or the terminal supports forwarding a DNS response received from the DNS server specified by the operator to an application.

Optionally, the radio frequency unit 701 is further configured to receive the DNS response returned by the target DNS server after sending the to-be-sent message to the target DNS server specified by the operator, where the DNS response carries the address information of the target server, and the target server is a server with a closest topological distance to the terminal obtained by resolving the to-be-sent message.

Optionally, the radio frequency unit 701 is further configured to forward the DNS response to the first application on the application layer after receiving the DNS response returned by the target DNS server, where the first application is an application that is to send the to-be-sent message.

An embodiment of this application further provides a network-side device including a processor and a communications interface. The processor is configured to implement the processes of the foregoing embodiment of the method for configuring a DNS server, and the communications interface is configured to communicate with a terminal. The network-side device embodiment corresponds to the foregoing network-side device method embodiment. All implementations in the foregoing method embodiment may be applicable to the network-side device embodiment, with the same technical effects achieved.

Figure 8:
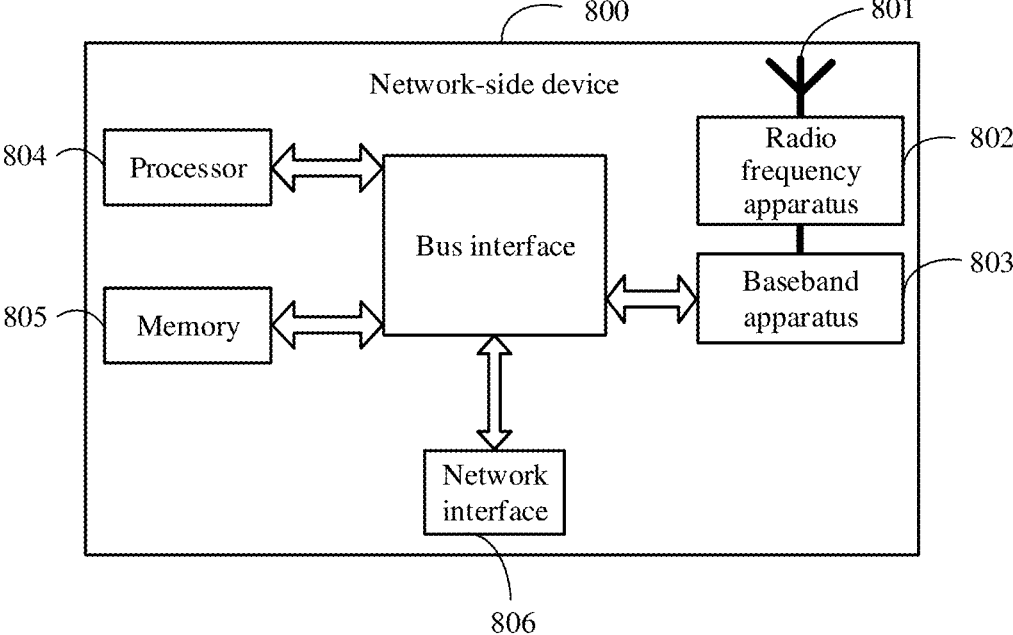
FIG. 8 is a schematic diagram of a hardware structure of a network-side device according to an embodiment of this application.

Specifically, an embodiment of this application further provides a network-side device. As shown in FIG. 8, the network-side device 800 includes an antenna 801, a radio frequency apparatus 802, and a baseband apparatus 803. The antenna 801 is connected to the radio frequency apparatus 802. In an uplink direction, the radio frequency apparatus 802 receives information through the antenna 801, and sends the received information to the baseband apparatus 803 for processing. In a downlink direction, the baseband apparatus 803 processes to-be-sent information, and sends the information to the radio frequency apparatus 802; and the radio frequency apparatus 802 processes the received information and then sends the information out through the antenna 801.

The band processing apparatus may be located in the baseband apparatus 803. The method performed by the network-side device in the foregoing embodiment may be implemented in the baseband apparatus 803, and the baseband apparatus 803 includes a processor 804 and a memory 805.

The baseband apparatus 803 may include, for example, at least one baseband processing unit, where a plurality of chips are disposed on the baseband processing unit. As shown in FIG. 8, one of the chips is, for example, the processor 804, connected to the memory 805, to invoke the program in the memory 805 to perform the operation of the network device shown in the foregoing method embodiment.

The baseband apparatus 803 may further include a network interface 806 configured to exchange information with the radio frequency apparatus 802, where the interface is, for example, a common public radio interface (CPRI).

Specifically, the network-side device in this embodiment of this application further includes: instructions or a program stored in the memory 805 and executable on the processor 804. The processor 804 invokes the instructions or program in the memory 805 to execute the method executed by the modules shown in FIG. 5, with the same technical effects achieved. To avoid repetition, details are not repeated herein.

An embodiment of this application further provides a non-transitory readable storage medium, where the non-transitory readable storage medium has stored thereon a program or instructions, and when the program or instructions are executed by a processor, the processes of the foregoing embodiment of the method for sending a DNS message are implemented, or the processes of the foregoing embodiment of the method for configuring a DNS server are implemented, with the same technical effects achieved. To avoid repetition, details are not repeated herein.

The processor is a processor in the terminal in the foregoing embodiment. The non-transitory readable storage medium includes a non-transitory computer-readable storage medium such as a computer read-only memory (ROM), a random access memory (RAM), a magnetic disk, an optical disc, or the like.

An embodiment of this application further provides a chip, where the chip includes a processor and a communications interface, the communications interface is coupled to the processor, and the processor is configured to run a program or instructions to implement the processes of the foregoing embodiment of the method for sending a DNS message, or to implement the processes of the foregoing embodiment of the method for configuring a DNS server, with the same technical effects achieved. To avoid repetition, details are not repeated herein.

It should be understood that the chip mentioned in this embodiment of this application may also be referred to as a system-level chip, a system chip, a chip system, a system-on-chip, or the like.

An embodiment of this application further provides a computer program or program product, where the computer program or program product is stored in a non-transitory storage medium, and the program/program product is executed by at least one processor to implement the processes of the foregoing embodiment of the method for sending a DNS message, or to implement the processes of the foregoing embodiment of the method for configuring a DNS server, with the same technical effects achieved. To avoid repetition, details are not repeated herein.

It should be noted that the terms "include", "comprise", or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. In the absence of more restrictions, an element preceded by "including a . . . " does not preclude another same element in the process, method, article, or apparatus that includes the element. In addition, it should be noted that the scope of the methods and apparatuses in the embodiments of this application is not limited to performing functions in the order shown or discussed, but may further include performing functions at substantially the same time or in reverse order depending on the involved functions. For example, the described method may be performed in an order different from the described order, and steps may be added, omitted, or combined. In addition, features described with reference to some examples may be combined in other examples.

Based on the above description of embodiments, persons skilled in the art can clearly understand that the methods in the foregoing embodiments can be implemented through software on a necessary general hardware platform or certainly through hardware only, but in many cases, the former is the more preferred implementation. Based on such an understanding, the technical solutions of this application essentially, or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other forms without departing from the principle of this application and the protection scope of the claims, and all such forms fall within the protection scope of this application.

What is claimed is:

1. A method for sending a DNS message, comprising:
obtaining, by a terminal, a to-be-sent message; and
sending the to-be-sent message to a target domain name system (DNS) server specified by an operator in case of determining that the to-be-sent message is a DNS query;
wherein
before the obtaining, by a terminal, a to-be-sent message, the method further comprises:
receiving address information of the target DNS server from a network-side device; wherein before receiving the address information of the target DNS server from the network-side device, the method further comprises:
sending, by the terminal, indication information to the network-side device, wherein the indication information is used to indicate that the terminal has a target capability, the target capability comprising at least one of the following:
the terminal is deployed with a first functional entity, wherein the first functional entity is capable of sending a DNS query request to the DNS server specified by the operator;
the terminal supports obtaining the address information of the DNS server specified by the operator from the network-side device through a PDU session and configuring the obtained address information of the DNS server to the PDU session;
the terminal supports not modifying a DNS configuration specified by the operator after the DNS configuration is obtained;
the terminal supports forwarding the DNS configuration specified by the operator to applications with a target permission, wherein the target permission is a permission to receive the address information of the DNS server specified by the operator; or
the terminal supports forwarding a DNS response received from the DNS server specified by the operator to an application.

2. The method according to claim 1, wherein after receiving the address information of the target DNS server from the network-side device, the method further comprises:
setting the address information of the target DNS server as a highest-priority DNS server address on an operating system of the terminal.

3. The method according to claim 1, wherein the receiving address information of the target DNS server from a network-side device comprises:
receiving, by the terminal, the address information of the target DNS server from the network-side device through a protocol data unit (PDU) session.

4. The method according to claim 3, wherein after the receiving address information of the target DNS server from a network-side device, the method further comprises:
binding the address information of the target DNS server with the PDU session.

5. The method according to claim 4, wherein the obtaining, by a terminal, a to-be-sent message comprises:

obtaining the to-be-sent message from a first application and determining that the to-be-sent message is to be sent over the PDU session; and
the sending the to-be-sent message to a target DNS server specified by an operator comprises at least one of the following:
sending the to-be-sent message by using the address information of the target DNS server as a destination address of the to-be-sent message; or
using the address information of the target DNS server for DNS query and/or resolution.

6. The method according to claim 1, wherein after receiving the address information of the target DNS server from the network-side device, the method further comprises:
forwarding the address information of the target DNS server to a second application on the application layer.

7. The method according to claim 6, wherein the second application is an application with a target permission, wherein the target permission is a permission to receive the address information of the DNS server specified by the operator.

8. The method according to claim 7, wherein before the obtaining, by a terminal, a to-be-sent message, the method further comprises:
obtaining identification information of applications with the target permission from the network-side device.

9. The method according to claim 1, wherein after the sending the to-be-sent message to a target DNS server specified by an operator, the method further comprises:
receiving the DNS response returned by the target DNS server, wherein the DNS response carries the address information of the target server, and the target server is a server with a closest topological distance to the terminal obtained by resolving the to-be-sent message.

10. The method according to claim 9, wherein after the receiving the DNS response returned by the target DNS server, the method further comprises:
forwarding the DNS response to the first application on the application layer, wherein the first application is an application that is to send the to-be-sent message.

11. A method for configuring a DNS server, comprising:
receiving, by a network-side device, indication information sent by a terminal, wherein the indication information indicates that the terminal has a target capability;
obtaining, by the network-side device, address information of a target domain name system (DNS) server specified by an operator; and
sending, by the network-side device, the address information of the target DNS server to the terminal;
wherein the target capability comprises at least one of the following:
the terminal is deployed with a first functional entity, wherein the first functional entity is capable of sending a DNS query request to the DNS server specified by the operator;
the terminal supports obtaining the address information of the DNS server specified by the operator from the network-side device through a PDU session and configuring the obtained address information of the DNS server to the PDU session;
the terminal supports not modifying a DNS configuration specified by the operator after the DNS configuration is obtained;
the terminal supports forwarding the DNS configuration specified by the operator to applications with a target permission, wherein the target permission is a permission to receive the address information of the DNS server specified by the operator; or the terminal supports forwarding a DNS response received from the DNS server specified by the operator to an application.

12. The method according to claim 11, wherein the obtaining, by the network-side device, address information of a target DNS server specified by an operator comprises:

obtaining, by the network-side device, the address information of the target DNS server based on subscription information of the terminal, location information of the terminal, and a user plane protocol data unit (PDU) session anchor (PSA) to which the terminal is anchored.

13. The method according to claim 11, wherein the sending, by the network-side device, the address information of the target DNS server to the terminal comprises:

sending, by the network-side device, the address information of the target DNS server to the terminal using protocol configuration options (PCOs).

14. The method according to claim 13, wherein after the obtaining, by the network-side device, address information of a target DNS server specified by an operator, the method further comprises at least one of the following:

indicating, by the network-side device, a functional identifier to the terminal, wherein the functional identifier is used to indicate a functional entity, corresponding to the functional identifier, to which an operating system or a chip sends the address information after receiving the address information of the target DNS server; or indicating, by the network-side device, an application identifier to the terminal, wherein the application identifier is used to indicate an application capable of obtaining the address information of the target DNS server.

15. The method according to claim 14, wherein before the indicating, by the network-side device, an application identifier to the terminal, the method further comprises at least one of the following:

receiving, by the network-side device, first indication information sent by the terminal, wherein the first indication information indicates applications on the terminal; determining, based on the first indication information, an application in the applications on the terminal that is capable of obtaining the address information of the target DNS server; or obtaining, by the network-side device, an identifier of an application contracted with the operator from a unified data management entity (UDM) or a unified data repository (UDR).

16. A terminal, comprising a processor, a memory, and a program or instructions stored in the memory and executable on the processor, wherein the program or instructions, when executed by the processor, cause the terminal to perform:

obtaining a to-be-sent message; and sending the to-be-sent message to a target domain name system (DNS) server specified by an operator in case of determining that the to-be-sent message is a DNS query;

wherein the computer program, when executed by the processor, causes the terminal to perform:

receiving address information of the target DNS server from a network-side device;

wherein the computer program, when executed by the processor, causes the terminal to perform:

sending, by the terminal, indication information to the network-side device, wherein the indication information is used to indicate that the terminal has a target capability, the target capability comprising at least one of the following:

the terminal is deployed with a first functional entity, wherein the first functional entity is capable of sending a DNS query request to the DNS server specified by the operator;

the terminal supports obtaining the address information of the DNS server specified by the operator from the network-side device through a PDU session and configuring the obtained address information of the DNS server to the PDU session;

the terminal supports not modifying a DNS configuration specified by the operator after the DNS configuration is obtained;

the terminal supports forwarding the DNS configuration specified by the operator to applications with a target permission, wherein the target permission is a permission to receive the address information of the DNS server specified by the operator; or the terminal supports forwarding a DNS response received from the DNS server specified by the operator to an application.

17. The method according to claim 1, wherein the network-side device comprises session management function (SMF).

18. The method according to claim 11, wherein the network-side device comprises session management function (SMF).

19. The terminal according to claim 16, wherein the network-side device comprises session management function (SMF).

20. The terminal according to claim 16, wherein the computer program, when executed by the processor, causes the terminal to perform:

receiving, by the terminal, the address information of the target DNS server from the network-side device through a protocol data unit (PDU) session.

* * * * *